United States Patent [19]
Webster et al.

[11] 3,725,798
[45] Apr. 3, 1973

[54] PROTON MASER ANTENNA TUNING MEANS

[75] Inventors: Jonathan C. Webster; Earl L. Sloan, III, both of Ridgesfield, Conn.; Alexander Ganssen, Munich, Germany

[73] Assignee: The United States of America as represented by the Secretary of the Air Force

[22] Filed: Sept. 3, 1971

[21] Appl. No.: 177,751

[52] U.S. Cl. .........................330/4, 332/7.5, 325/485
[51] Int. Cl. .................................................H01s 1/02
[58] Field of Search .......332/7.5; 330/4.5, 4; 331/94; 325/485

[56] References Cited

UNITED STATES PATENTS

| | | | |
|---|---|---|---|
| 3,564,258 | 2/1971 | Fringold | 330/4 |
| 3,333,101 | 7/1967 | Bell | 250/83.3 |
| 3,195,061 | 7/1965 | Jeffries et al. | 330/4 |

OTHER PUBLICATIONS

A. Ganssen et al., "Study and Investigation of a Proton Maser Antenna", 4/65, T.R.N. RADC-TR-64-567.

Primary Examiner—Benjamin A. Borchelt
Assistant Examiner—N. Moskowitz
Attorney—Harry A. Herbert, Jr. and Willard R. Matthews, Jr.

[57] ABSTRACT

Tuning means capable of extending the low frequency sensitivity of a proton maser antenna to higher frequencies are realized by magnetically chopping the effective permeability of the maser antenna magnet at the local oscillator frequency. This effectively chops the received signal at the local oscillator rate and translates it to the fixed system frequency $f_{IF}$. The system electronics are tuned to receive only the maser sidebands corresponding to $f_{IF}$, and tuning is accomplished by varying the local oscillator frequency.

3 Claims, 5 Drawing Figures

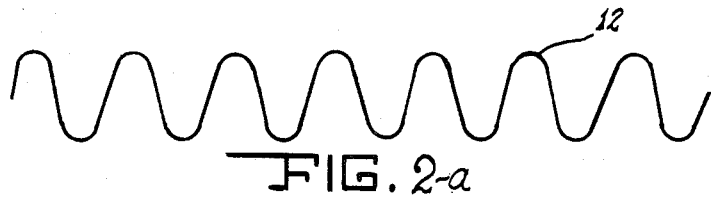
FIG. 2-a
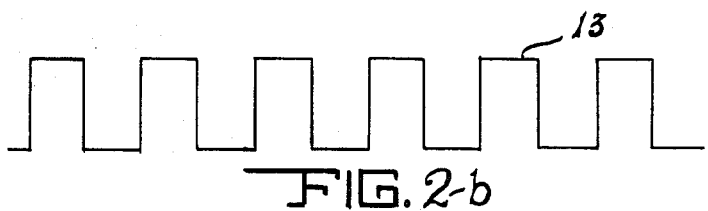
FIG. 2-b
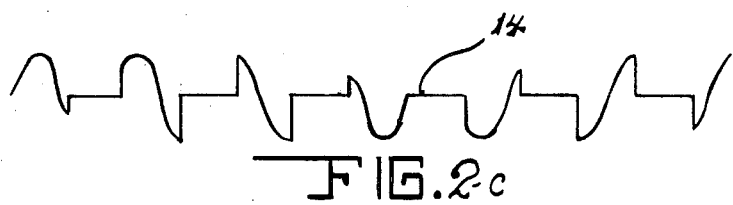
FIG. 2-c
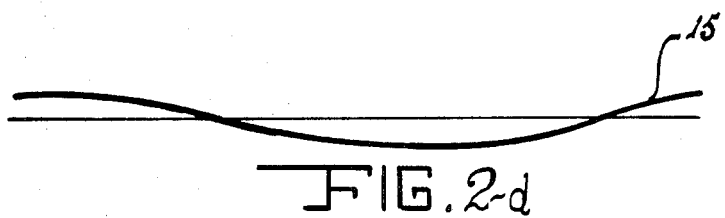
FIG. 2-d

PROTON MASER ANTENNA TUNING MEANS

BACKGROUND OF THE INVENTION

Proton maser antennas initially were developed to improve the reception of very low frequency electromagnetic waves. The loop antenna has been the traditional apparatus employed in the reception of such signals; however, certain difficulties become apparent as the wavelength of the signals becomes very long.

The rapid deterioration of conventional loop performance as the carrier frequency is reduced results from the unfavorable ratio of the antenna size to the signal wavelength. If ideal reception were to be achieved, the loop should extract *all* the energy passing within a radius of $\approx \lambda/5$. In practice, the loop may have an effective aperture not much larger than its own physical dimensions. When this picture is couched in electrical terms one says that the radiation resistance of the antenna is negligible compared to its internal ohmic losses. Hence, it is not efficiently coupled to the external radiation field. In particular, the field strength must exceed a minimum value so that the fraction of signal power intercepted is greater than the internally generated kTB noise power.

Very simply, since the induced Emf is proportional to the rate of change of the flux through the loop, the detected Emf will be inversely proportional to the wavelength. Therefore, for a fixed field strength, there is a minimum detectable frequency below which the signal will be masked by internal thermal noise.

The proton maser antenna is a device which has been developed to overcome these problems. Basically, such a device consists of a proton maser which is frequency modulated by the direct interaction of the electromagnetic field with dynamically polarized protons. The resulting sidebands are processed and detected to reconstitute the original signals.

By appropriate frequency multiplication and FM detection, even very low indices of modulation of the maser can be detected. The sideband power (for a given signal strength) is directly proportional to the maser power. Hence the useful signal power in the sidebands can greatly exceed that which the loop might have extracted from the passing wavefront. Since both sensors are competing against the same fundamental kTB Johnson noise, the potentialities of the proton maser antenna scheme can be appreciated. Furthermore, the nature of the FM sideband power is such that as the signal carrier frequency is reduced, the proton maser antenna detection capability is *increased*.

The Proton Maser Antenna is described in detail in the National Company, Inc. report designated Technical Report No. RADC-TR-64-567 entitled *Study and Investigation Of A Proton Maser Antenna* by Alexander Ganssen et al. dated April 1965.

Although the Proton Maser Antenna has proved effective, there has remained low frequency tuning problems to be solved. In particular, it would be very desirable to extend the improved low frequency sensitivity of such a device to higher frequencies.

This problem has been approached by tuning the system electronics to pick up the desired sideband of the maser. This method, however, has the disadvantage that the modulation index decreases with increasing carrier frequency, thereby giving decreased sensitivity at the higher frequencies.

Although it would be possible to achieve low frequency tuning by periodically chopping the effective permeability of the maser magnet, there are no currently available chopping devices capable of effecting the required chopping function. For instance, state of the art mechanical choppers require extremely high rotation rates for high carrier frequencies and saturating schemes require huge amounts of power in order to saturate coils at high frequencies. The present invention comprehends a proton maser tuning device that utilizes the periodic chopping technique and that provides new and improved circuits for accomplishing the chopping function.

SUMMARY OF THE INVENTION

The present invention achieves tuning of the proton maser antenna by a heterodyning scheme which comprehends mu-switching the maser magnet. The maser magnet of a conventional proton maser antenna is replaced by a magnet having flux concentrating members protruding from opposite poles. Series connected eddy current coils are wound around the flux concentrating members and are periodically shorted out by switching means. The switching means is operated at the system local oscillator frequency. This chops the effective permeability of the magnet at system frequency. Tuning is achieved by varying the local oscillator frequency. The system electronics are tuned to receive only the maser sidebands corresponding to the system frequency. A unique diode switch is used which provides both high frequency switching capability and low "on" resistance in the eddy current coil circuit.

It is a principal object of the invention to provide a new and improved proton maser antenna that can be tuned over a wider frequency range than similar currently available antennas.

It is another object of the invention to provide a proton maser antenna that is tuned by means of periodically chopping the effective permeability of the maser antenna magnet.

It is another object of the invention to provide a proton maser antenna of the type described having low resistance high frequency diode switching means.

These, together with other objects, advantages and features of the invention, will become more apparent from the following detailed description taken in conjunction with the illustrative embodiments in the accompanying drawings.

DESCRIPTION OF THE DRAWING

FIG. 2 illustrates the various waveforms associated with the magnetic heterodyning effects of the invention.

DESCRIPTION OF THE PREFERRED EMBODIMENT

Figure 1:
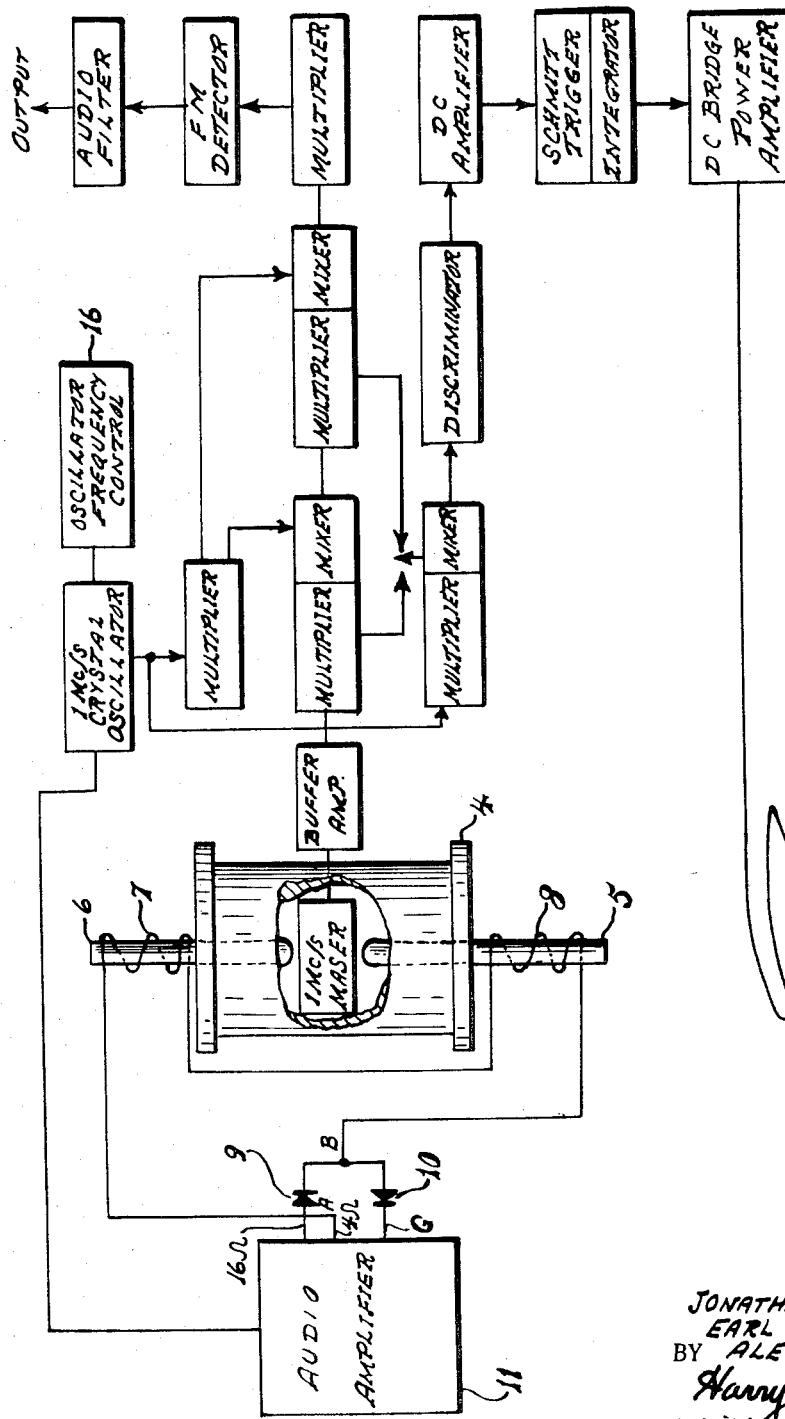
FIG. 1 is a schematic, partly in the form of a block diagram, illustrating a proton maser antenna in combination with the tuning means of the present invention.

The basic proton maser antenna comprehended herein is illustrated in block diagram form in FIG. 1. Such an antenna is described in detail in the National Company report incorporated herein by references.

The tuning means of the invention comprises maser magnet 4, flux concentrators 5 and 6, eddy current coils 7 and 8, oscillator frequency control 16 and switching means consisting of diodes 9 and 10 and audio amplifier 11.

The heterodyne method of the invention which is analogous to a superheterodyne receiver permits the reception of higher frequencies with a sensitivity comparable to that attained for low frequency reception. This is accomplished by magnetically chopping the received signal at the "local oscillator" rate, thereby translating it to the fixed system frequency $f_{IF}$. The electronics are then tuned to receive only the maser sidebands corresponding to $f_{IF}$, and tuning is accomplished by varying the local oscillator frequency.

The magnetic field at the sample resulting from the received signal is chopped by changing the effective permeability of the magnetic structure at the local oscillator rate. The following is a mathematical demonstration that this technique produces the desired results — a magnetic field varying with the frequency $f_{IF}$ at the sample. The received signal may be expressed as:

$$H_{rec}(t) = H_r \cos \frac{(f_r t)}{2\pi} \quad (1)$$

Let it be assumed that the effective permeability of the magnet structure, $\mu_{eff}(t)$, is being varied so that the fundamental component is at the frequency $f_{LO}$, and that the form of $\mu_{eff}(t)$ $$\mu_{eff}(t) = \mu_0 a_0 + \mu_0 a_1 \cos\left(\frac{f_{LO}}{2\pi} t\right) + \mu_0 \sum_{n=2}^{\infty} a_n \cos\left(\frac{n f_{LO}}{2\pi} t\right) \quad (2)$$

If it is also assumed that $f_{LO}$ and $f_{IF}$ are chosen so that there will be no interference from components at frequencies $2f_{LO} - f_r$, $3f_{LO} - f_r$, etc., then $\mu_{eff}(t)$ can be written in the form:

$$\mu_{eff}(t) = \mu_0 \left[ a_0 + a_1 \cos\left(\frac{f_{LO}}{2\pi} t\right) \right] \quad (3)$$

The time dependent magnetic field at the sample is given by:

$$H_{sample}(t) = \frac{\mu_{eff}(t)}{\mu_0} H_{rec}(t)$$

so that $$H_s(t) = H_r \left[ a_0 + a_1 \cos\left(\frac{f_{LO}}{2\pi} t\right) \right] \cos\left(\frac{f_r}{2\pi} t\right)$$

or, $$H_s(t) = a_0 H_r \cos\left(\frac{f_r}{2\pi} t\right) + a_1 H_r \cos\left(\frac{f_{LO}}{2\pi} t\right) \cos\left(\frac{f_r}{2\pi} t\right)$$

giving:

$$H_s(t) = a_0 H_r \cos\left(\frac{f_r}{2\pi} t\right) + \frac{a_1 H_r}{2} \left[ \cos\left(\frac{f_r + f_{LO}}{2\pi} t\right) + \cos\left(\frac{f_r - f_{LO}}{2\pi} t\right) \right] \quad (4)$$

The term oscillating at the sum frequency is not of interest since it will not be detected by the electronics, therefore:

$$H_s(t) = a_0 H_r \cos\left(\frac{f_r}{2\pi} t\right) + \frac{a_1}{2} H_r \cos\left(\frac{f_{IF}}{2\pi} t\right) \quad (5)$$

where it is assumed that $f_{LO}$ has been adjusted so that $f_r - f_{LO} = f_{IF}$. This is exactly the desired result. The associated waveforms for an idealized case in which $\mu_{eff}$ is switched on and off are shown in FIGS. 2a through 2d. Having reference to these figures, waveform 12 is the received signal, waveform 13 illustrates the effective permeability, waveform 14 illustrates the magnetic field at the sample and waveform 15 illustrates the magnetic field observed with a long time constant.

Since the effective permeability cannot be less than zero and since it cannot exceed the maximum CW value $(\mu_{eff})_{max}$, it can be concluded that:

$$a_0 + a_1 = (\mu_{eff})_{max}, \quad (6)$$

where any non-sinusoidal characteristics of $\mu_{eff}(t) - \mu_0 a_0$ have been neglected. The practical problem then is reduced to making $a_1 - a_0$ as small as possible. This is accomplished by the eddy current switching means of the present invention.

The basic concept of the invention utilized to accomplish periodic switch of the effective permeability of the maser magnet is that of eddy current flux-cancelling. Eddy current coils 7 and 8 are wound around the flux concentrators 5 and 6 as shown in FIG. 1. The operation of this method is based on the exclusion of time varying flux from a shorted turn. That is, the emf induced in a shorted coil gives rise to an eddy current which, in turn, produces a flux which tends to cancel the applied flux. The resistance around the loop of the coil plus its "short" must be kept at a minimum for this method to be effective.

It is therefore necessary to use a switch that can operate at up to 10,000 Hz and yet have extremely low "on" resistance. This is accomplished by means of switching diodes 9 and 10 and audio amplifier 11. The audio amplifier and hence the switching frequency are responsive to the system local oscillator. The diodes are chosen for minimum potential developed between points A and B.

It will be understood that various changes in the detailed materials and arrangements of parts which have been described and illustrated in order to explain the nature of the invention may be made by those skilled in the art within the principle and scope of the invention as expressed in the appended claims. For example, various switching schemes and other mechanics for chopping the effective perambility of the maser magnet could be used.

What is claimed is:

1. The combination of a proton maser antenna having a local oscillator and magnet means and tuning means, said tuning means comprising:
   means for varying the frequency of said local oscillator, and
   means for chopping the effective permeability of said magnet means at the local oscillator frequency.

2. The combination of a proton maser amplifier and tuning means defined in claim 1 wherein said magnet means includes flux concentration means.

3. The combination of a proton maser amplifier and tuning means defined in claim 2 wherein said means for chopping the effective permeability of the magnet means comprises eddy current coil means operably connected to said flux concentration means and means for shorting said coil means at the local oscillator frequency.

* * * * *